United States Patent [19]

Kato et al.

[11] Patent Number: 4,504,875
[45] Date of Patent: Mar. 12, 1985

[54] INFORMATION SCANNING CIRCUIT FOR USE WITH A DETACHABLE PORTABLE CASSETTE TAPE RECORDER

[75] Inventors: Kunihiko Kato; Akihiko Murahashi, both of Maebashi, Japan

[73] Assignee: Victor Company of Japan, Ltd., Yokohama, Japan

[21] Appl. No.: 471,216

[22] Filed: Mar. 1, 1983

[30] Foreign Application Priority Data

Mar. 8, 1982 [JP] Japan .................. 57-32338[U]

[51] Int. Cl.³ .................. G11B 15/02; G11B 31/00
[52] U.S. Cl. .................. 360/72.1; 360/137
[58] Field of Search .................. 360/72.1, 74.4, 137

[56] References Cited

U.S. PATENT DOCUMENTS

| | | | |
|---|---|---|---|
| 3,665,117 | 5/1972 | Staar | 179/100.1 VC |
| 3,916,122 | 10/1975 | Sato et al. | 179/100.11 |
| 4,021,856 | 5/1977 | Motoyama et al. | 360/74 |
| 4,115,821 | 9/1978 | Okada | 360/72 |

Primary Examiner—George G. Stellar
Attorney, Agent, or Firm—Lowe, King, Price & Becker

[57] ABSTRACT

A cassette tape recorder (1) of pocket size, which is detachably coupled to a radio receiver (2) is given music searching function. The cassette tape recorder (1) is normally powered by small capacity cells (B1) when used by itself, and is powered by a large capacity power source (B2) included in the radio (2). A reproducing signal derived from a reproduce head (9) is fed to a solenoid control circuit (14) built in the radio (2) to detect a no-signal portion between two consecutive music pieces. When such a no-signal portion is detected during music search with fast playback, a solenoid driving signal is fed to a solenoid (12) built in the tape recorder (1) to terminate fast playback and put the tape recorder (1) in a normal playback mode. A switch (S1) arranged to be automatically switched when the tape recorder (1) engages the radio (2) is provided to automatically select the small or large capacity power source (B1 or B2).

10 Claims, 4 Drawing Figures

INFORMATION SCANNING CIRCUIT FOR USE WITH A DETACHABLE PORTABLE CASSETTE TAPE RECORDER

BACKGROUND OF THE INVENTION

This invention relates generally to cassette tape recorders, and more particularly, the present invention relates to information or music scanning circuitry adapted to such cassette tape recorders.

Nowadays, many cassette tape recorders having a radio has a music scanning function so that a desired piece of music in a music tape can be readily played back. Music scanning, which is also called top-finding, is a function of searching and finding a desired piece of information or music prerecorded in a magnetic recording tape. Namely, the prerecorded information is played back at a high speed so that the amplitude of the reproduced signal is detected to find a no-signal portion positioned between two consecutive information or music pieces. When such a no-signal portion is detected, the fast playback is terminated to put the tape recorder in normal playback mode so that the desired piece of music or the like can be played back from the beginning thereof.

High-speed playback is actualized by depressing both a playback button and a fast forwarding or rewinding button simultaneously, and fast playback is continuously effected until a no-signal portion is detected. Therefore, music scanning mode consumes relatively large electrical power when compared with other operating modes. For this reason, music scanning function is provided to tape recorders which are powered by an a.c. line or large capacity cells. In other words, portable tape recorders of pocket size which are powered by small capacity cells, do not have such music scanning function.

Furthermore, in a cassette tape recorder having a mechanical manipulative buttons, the music scanning circuit or device requires a solenoid which automatically stops fast playback in response to a detection signal, and as a result, the music scanning circuit causes the increase in current consumed by the motor and the solenoid, while the solenoid control circuit is subjected to power source condition, in other words it is less tolerable to power source voltage drop.

This music scanning feature may be incorporated into a cassette tape recorder with a radio receiver having already many other functions. As a result it may become larger and larger in size and inconvenient for carrying. On the other hand, pocket size tape recorders are appreciated in the market for their portability.

However, since such portable cassette tape recorders use U-3 type cells, most of them are capable of only monaural recording and playback with headphone, and therefore portable cassette tape recorders with a music scanning circuit is not yet in the stage for practical application due to the above-mentioned power source conditions.

Recently, portable tape recorders with a radio receiver arranged such that a pocket size cassett tape recorder is detachably coupled with a radio receiver body, have appeared in the market. Although such detachably arranged tape recorder sets satisfy the requirements of portable and handy use or the tape recorder proper and also many functions, such combined or coupled sets have been provided to add various functions, such as playback with high power via speakers, recording of radio programs, and long-time recording by using a power source of large capacity in addition to the original function of the tape recorder proper.

SUMMARY OF THE INVENTION

The present invention has been developed in order to remove the above-described drawbacks inherent to the conventional cassette tape recorders.

It is, therefore, an object of the present invention to provide a new and useful music or information scanning circuit for use with a detachable portable cassette tape recorder.

According to a feature of the present invention when a portable cassette tape recorder is coupled with an assoiciated device, such as a radio powered by a relatively large capacity power source, the tape recorder is powered by the large capacity power source so that not only the motor thereof but also a solenoid used for effecting music scanning is powered by the relatively large capacity power source. A solenoid control circuit is built in the associated device so that it is powered by the large capacity power source. Connectors are provided to establish electrical connection between the cassette tape recorder and the associated device.

In accordance with the present invention there is provided a circuit arrangement for use with a cassette tape recorder detachably attahced to an associated powered device, for searching a piece of information from a recorded magnetic cassette tape, the cassette tape recorder having a reproduce head for deriving an output signal from a cassette tape, a motor for driving the cassette tape, and a first power source, the cassette tape recorder being capable of performing fast playback, the associated powered device having a second power source whose capacity is larger than that of the first power source, the circuit arrangement comprising: a solenoid built in the cassette tape recorder to cause the mechanism of the cassette tape recorder to terminate the fast playback when actuated in response to a change in a solenoid driving signal; a first switch for selectively supplying electrical power from the first or second power source to the motor; a second switch built in the cassette tape recorder, and responsive to the fast playback mode for connecting the solenoid to the second power source; a solenoid control circuit built in the associated powered device, and responsive to the output signal from the reproduce head for producing the solenoid driving signal, the solenoid control circuit being powered by the second power source; and connecting means for supplying electrical power from the second power source to the solenoid and the motor, for supplying the solenoid driving signal to the solenoid, and for supplying the output signal from the reproduce head to the solenoid control circuit when the cassette tape recorder is coupled with the associated powered device.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Figure 1:
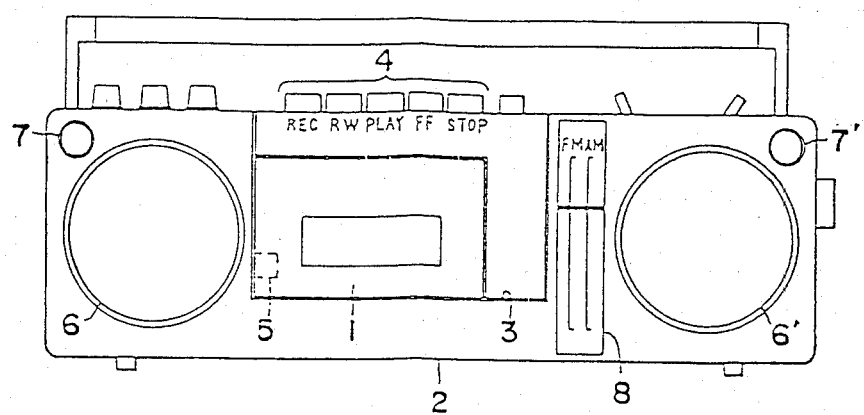
FIG. 1 is a schematic front view of the combination of a cassette tape recorder and a radio, to which combination the present invention is adapted.

Referring now to FIG. 1, a front view of the combination of a cassette tape recorder 1 and an associated radio receiver 2 is shown. The cassette tape recorder 1 is detachably attached to a receiving portion 3 provided at about the center of the radio receiver 2. In detail, the radio receiver 2 has a rectangle recess as the receiving portion 3 for receiving the cassette tape recorder 1. In order to combine the cassette tape recorder 1 with the radio receiver 2, the cassett tape recorder 1 is inserted into the recess so that electrical connction therebetween is established as will be described later. On the other hand, the cassette tape recorder 1 can be detached from the radio receiver 2 by either pulling up the cassette tape recorder or by depressing an unshown release button.

The cassette tape recorder 1 is of pocket size, and comprises a group of manipulative buttons 4 for selecting one of record, playback, fast forward, rewind, or stop modes. The cassette tape recorder 1 also has a microphone 5 so that the recording can be effected even when the cassette tape recorder 1 is used by itself. However, such a microphone is unnecessary if the tape recorder 1 is designed as a tape player used for only reproduction. The cassette tape recorder 1 is basically powered by small capacity cells, such as two U-3 type cells because larger capacity cells, such as U-1 or U-2 type cells occupy a large space. The tape recorder 1 per se is capable of effecting monaural recording, fast forwarding, rewinding, and stereo playback by way of a headphone.

On the other hand, the radio receiver 2 comprises speakers 6 and 6', stereophonic microphones 7 and 7', a radio tuning dial 8 etc, and is powered by larger capacity cells, such as six U-2 type batteries so that stereo recording, stereo playback, recording of radio programs can be effected when the casstte tape recorder 1 is coupled with the radio receiver 2. The radio receiver 2 per se can be used as a normal radio receiver without the cassette tape recorder 1. The larger capacity cells may be replaced with a power source which produces d.c. power from a.c. power, or such a power source may be provided in addition to the larger capacity cells. The smaller capacity cells included in the cassette tape recorder 1 is referred to as a first power source, and the larger capacity cells and/or the above-mentioned power source included in the radio receiver 2 is referred to as a second power source hereafter.

The second power source is connected to a connector via which electrical power from the second power source is applied to the tape recorder 1 when the tape recorder 1 is attached or coupled to the radio receiver. In addition an output signal from a reproduce or record/reproduce head of the tape recorder 1 is arranged to be fed via another connector to the radio receiver 2. Another connector is provided to establish electrical connection between the tape recorder 1 and the radio receiver 2 so that a solenoid driving signal, which will be described later, is fed from the radio receiver 2 to the tape recorder 1.

Figure 2:
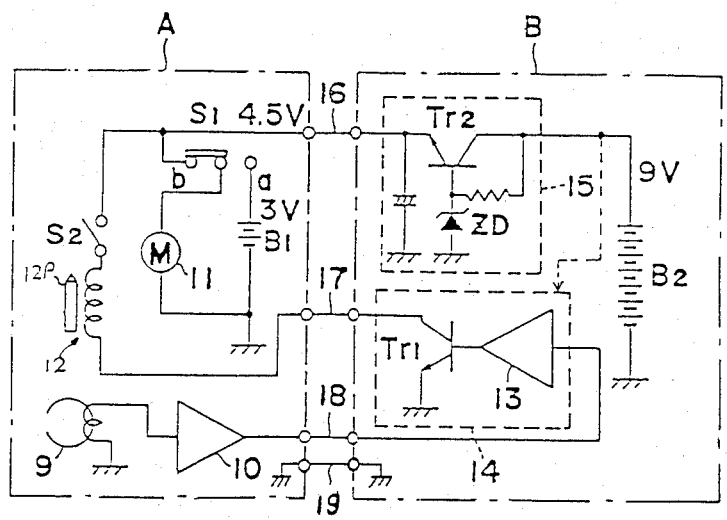
FIG. 2 is a circuit diagram showing an embodiment of the music scanning circuit according to the present invention.

FIG. 2 shows a circuit arrangement of an embodiment of the music scanning circuit according to the present invention. The circuit comprises various elements which are built in either the cassette tape recorder 1 or the radio receiver 2. In order to make clear, the entire circuit is divided into a cassette tape recorder portion A and a radio receiver portion B. The tape recorder portion A comrises a record/reproduce head 9, a reproducing amplifier 10, a motor 11 for driving an unshown cassette tape, and a solenoid 12 for effecting music scanning. Two U-3 type cells are built in as its power source B1, i.e. the above-mentioned first power source. The tape recorder portion A comprises a power switch S1 for switching between the first power source B1 and the second power source B2 of large capacity, and a solenoid switch S2, which is closed when music scanning.

On the other hand, the radio receiver portion B comprises a solenoid control circuit 14 having a signal detecting circuit 13 and a switching transistor Tr1, six U-2 type cells as the second power source B2, and a constant voltage circuit 15 having a voltage control transistor Tr2 and a zener diode ZD. The constant voltage circuit 15 receives 9 volts from six U-2 type cells to produce stablized 4.5 volts output. Hereafter, the words, second power source B2, are used to mean the combination of the cells and the constant voltage circuit 15.

As shown in FIG. 2, four electrical connecting lines 16, 17, 18 and 19 are provided between the tape recorder portion A and the radio receiver portion B for establishing electrical connection therebetween. The above-mentioned power switch S1 and solenoid switch S2 of the tape recorder portion A are referred to as first and second switches S1 and S2. The first switch S1 is used to selectively supply electrical power to the motor 11 from the first or second power source B1 or B2. Namely, 3 volts from the first power source B1 or 4.5 volts from the second power source B2 is selectively fed to the motor 11. The tape recorder 1 is shown to be detached or disengaged from the radio receiver 2, and may be attached to the radio receiver 2 when moved downward from the position shown in FIG. 3. The tape recorder 1 comprises four receiving jacks 20, 24, 28 and 32 at its bottom, while the radio receiver 2 comprises four projecting pins 22, 26, 30 and 34. The jacks 20, 24, 28 and 32, and the pins 22, 26, 30 and 34 are respectively aligned so that they are in contact with each other when the tape recorder 1 is installed in the radio receiver 2. The jack 20 and the pin 22 therefore constitute a connector or an electrical connecting line which actualizes the electrical connecting line 16 of FIG. 2. In the same manner other three combinations of the jack 24 and the pin 26, the jack 28 and the pin 30, and the jack 32 and the pin 34 also constitute other three connectors corresponding to the electrical connecting lines 17, 18 and 19.

Figure 3:
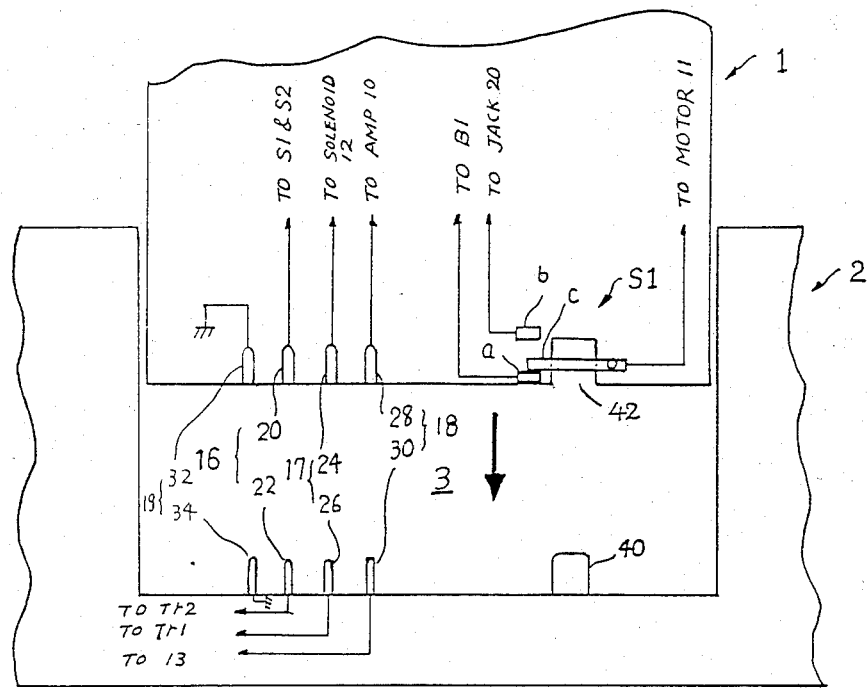
FIG. 3 is a schematic view showing the structure of the first switch and the electrical connecting lines shown in FIG. 2.

The above-mentioned points will be further described in detail with reference to FIG. 3 showing the mechanical relationship between the tape recorder 1 and the radio receiver 2. The first switch S1 of FIG. 2 is also shown in FIG. 3 as a mechanical switch having a movable contact c and two stationary contacts a and b. The movable contact c is made of a leaf spring or biased by a coil spring or the like so as to be in contact with the stationary contact a when the tape recorder 1 is disengaged from the radio receiver 2. The first switch S1 is positioned within the casing of the tape recorder 1 at a bottom thereof. The bottom has an opening or small window 42 through which the movable contact c can be depressed upwardly against the force of the spring. On the other hand, a projection 40 is provided at the bottom of the recess 3 of the radio receiver 2 so that the projection 40 will be inserted through the opening 42 when the tape recorder 1 is engaged with the radio receiver 2. When engaged therefore, the movable contact c is moved upwardly by the projection 40 to cause the same to be in contact with the stationary contact b. In this way, switching between the first and second power sources B1 and B2 is automatically effected when the tape recorder 1 is coupled with the radio receiver 2.

Figure 4:
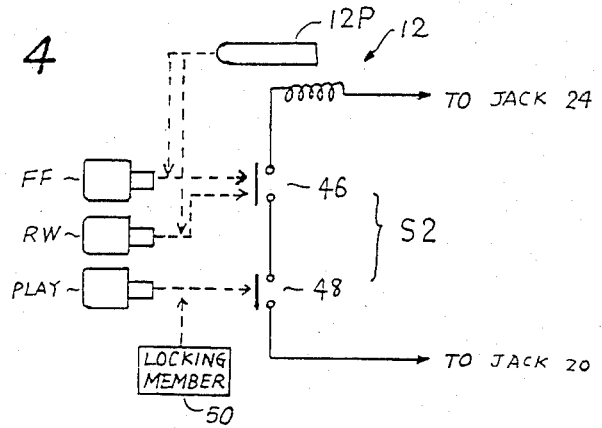
FIG. 4 is a circuit diagram showing the detailed structure of the second switch shown in FIG. 2.

The second switch S2 is to be closed when both a playback button (PLAY) and the fast foward or rewind button (FF or REW) are simultaneously depressed as described in the above. The second switch S2 therefore may be actualized by way of a semiconductor switch or mechanical switches responsive to these buttons. FIG. 4 shows an example of the second switch S2 comprised of two mechanical switches 46 and 48 connected in series. Switch 46 is arranged to be closed when the fast forward or rewind button (FF or REW) is manipulated, while the other switch 48 is arranged to be closed when the playback button (PLAY) is manipulated. Therefore, when the playback button (PLAY) and the fast forward or rewind button (FF or REW) are simultaneously depressed to put the tape recorder in fast playback or scanning mode, the switches 46 and 48 are both closed to connect one terminal of the solenoid 12 to the positive terminal of the second power source B2 if the tape recorder 1 is engaged with the radio receiver 2.

The solenoid 12 comprises a movable plunger 12P which is engageable with the fast forward and rewind buttons (FF and REW) for locking one of these buttons at its depressed position. In detail, when the fast forward or rewind button (FF or REW) and the playback button (PLAY) are simultaneously depressed, and when the other terminal of the solenoid is grounded as will be described later, the solenoid 12 is energized by receiving power from the second power source B2. As a result, the plunger 12P thereof locks the fast forward or rewind button (FF or REW) to keep the button at its depressed position. At this time, the playback button (PLAY) is also locked at its depressed position by way of a mechanical locking member 50. Therefore, the switches 46 and 48 of FIG. 4 are continuously closed to keep energization of the solenoid 12.

The reproduing amplifier 10 is responsive to reproducing signals from the record/reproduce head 9. The output signal of the amplifier 10 is fed via the above-mentioned connecting line 18 to the solenoid control circuit 14 built in the radio receiver 2. The detecting circuit 13 included in the solenoid control circuit 14 may be a comparator 13, and the switching transistor Tr1 is arranged to be responsive to the output signal from the detecting circuit 13. The solenoid control circuit 14 is powered by the second power source B2 as indicated by a dotted line. The switching transistor Tr1 is of n-p-n type and its collector is connected to the pin 30 of FIG. 3 so that the collector will be connected to one terminal of the solenoid 12 when the tape recorder engages the radio receiver 2. The emitter of the switching transistor Tr1 is grounded, and the base is connected to the output terminal of the detecting circuit 13.

In addition to the above, the tape recorder portion A comprises a recording amplifier and a headphone amplifier, while the radio receiver portion B comprises a radio tuner and a power amplifier, but these circuits are not directly related to the present invention, and thus they are not shown.

The music scanning circuit according to the present invention operates as follows. When the tape recorder 1 is used by itself, namely when the tape recorder 1 is disengaged from the radio receiver 2, music scanning cannot be performed. The tape recorder 1 is powered by the first power source B1 to function as a portable tape recorder which is capable of monaural recording, streophonic playback with a headphone, fast forwarding, and rewinding. When the tape recorder 1 engages the radio receiver 2, the first switch S1 is switched automatically so that the motor 11 is powered by the second power source B2 in place of the first power source B1. Assuming that the playback button (PLAY) and the fast forward or rewing button (FF, or REW) are simultaneously depressed, the second switch S2 is closed. Thus fast playback is started causing the head 9 to pickup signals indicative of the reproduced information of music prerecorded in the cassette tape. The reproduced signal is fed via the amplifier 10, and the connecting line 18 to the detecting circuit 13 of the solonoid control circuit 14. The outplut signal level from the amplifier 10 is compared with a reference voltage which is close to zero volt. As long as information is picked up by the head 9, the output signal level does not fall to zero. Therefore, the detecting circuit 13 produces a high level output signal which renders the switching transistor Tr1 conductive. As a result, the solenoid 12 is energized to move the plunger 12P thereof in a locking position for locking the fast forward or rewind button (FF or REW). Therefore, the prerecorded information is played back at a high speed. When a no-signal portion between two consecutive music or information pieces comes, the output signal level from the head 9 suddenly drops to substantially zero. Therefore, the output signal level of the detecting circuit 13 turns low rendering the switching transistor Tr1 nonconductive. As a result, the solenoid 12 is deenergized to unlock the fast forward or rewind button (FF or RW). Accordingly, fast playback is terminated. At this time, it is noted that the playback button (PLAY) is still locked by the mechanical locking mechanism 50 of FIG. 4, and therefore, playback is continuously kept. Namely, as soon as the no-signal portion is detected, the tape recorder 1 is put in normal playback mode from the fast playback mode. Therefore, a subsequent piece of information or music will be reproduced at normal speed from the beginning. If the reproduced information piece is not one desired by the user, the fast forward or rewind button (FF or RW) may be depressed again to continue music search.

In the above embodiment, although the solenoid 12, which locks the fast forwad or rewind button (FF or REW), is arranged to be continuously energized by the solenoid control circuit 14 during fast playback, and is deenergized when a no signal portion between music pieces is detected, another arrangement may be possible such that the fast forward or rewind button (FF or REW) is locked by way of a mechanical locking member, and the solenoid 12 is temporarily energized to unlock the locking when no signal portion between music pieces is detected. To arrange the circuit of FIG. 2 in this way, the detecting circuit 13 of the solenoid control circuit 14 may be adapted to produce a low level singnal in response to the output signal from the amplifier 10 and to produce a high lever signal when the amplifier output signal falls zero.

Furthermore, in the above embodiment, although the cassette tape recorder 1 is detachably coupled to the radio receiver 2, which is described as an associated device, such an associated device is not limited to a radio receiver. Namely, the cassette tape recorder 1 may be designed to be coupled with other devices, such as a power amplifier, tone control circuit, transmitter or the like, as long as the associated device is powered by a larger capacity power source.

Since the music scanning circuit according to the present invention makes it possible to provide a small and light tape recorder by installing a minimum number of parts in the cassette tape recorder, while the solenoid control circuit 14 which is necessary for music scanning operation, and large capacity power source etc are received in the associated device so that music scanning can be effected when both devices are coupled together.

According to the present invention it is possible to fulfill two requirements, one being the portable use of the cassette tape recorder when used by itself, and the other being multiple functions required to a cassette tape recorder having a radio receiver or the like because the number of parts or elements required to be built in the cassette tape recorder casing is very small, and the solenoid 12 as well as the motor 11 is arranged to be powered by the larger capacity power source B2 built in the associated device 2.

Although according to the illustrated embodiment of FIG. 3, the jacks 20, 24 an 28 are provided to the cassette tape recorder 1 and the pins 22, 26 and 30 are on the radio receiver 2, the location thereof may be reversed. Furthermore, in the illustrated embodiment only three connecing lines 16, 17 and 18 are shown because other connecting lines including lines for transmitting electrical signals from the stereophonic microphones 7 and 7' to the tape recorder 1 etc are not directly related to the music scanning circuit according to the present invention.

The above-described embodiments are just examples of the present invention, and therefore, it will be apparent for those skilled in the art that many modifications and variations may be made without departing from the spirit of the present invention.

What is claimed is:

1. A circuit arrangement for use with a cassette tape recorder detachably attached to an associated powered device, for searching a piece of information from a recorded magnetic cassette tape, said cassette tape recorder having a reproduce head for deriving an output signal from a cassette tape, a motor for driving said cassette tape, and a first power source, said cassette tape recorder being capable of performing fast playback, said associated powered device having a second power source whose capacity is larger than that of said first power source, said circuit arrangement comprising:
   (a) a solenoid built in said cassette tape recorder to cause the mechanism of said cassette tape recorder to terminate said fast playback when actuated in response to a change in a solenoid driving signal;
   (b) a first switch for selectively supplying electrical power from said first or second power source to said motor;
   (c) a second switch built in said cassette tape recorder, and responsive to the fast playback mode for connecting said solenoid to said second power source;
   (d) a solenoid control circuit built in said associated powered device, and responsive to said output signal from said reproduce head for producing said solenoid driving signal, said solenoid control circuit being powered by said second power source; and
   (e) connecting means for supplying electrical power from said second power source to said solenoid and said motor, for supplying said solenoid driving signal to said solenoid, and for supplying said output signal from said reproduce head to said solenoid control circuit when said cassette tape recorder is coupled with said associated powered device.

2. A circuit arrangement as claimed in claim 1, wherein said first switch comprises a mechanical switch arranged to be switched when said cassette tape recorder engages said associated device and disengages therefrom.

3. A circuit arrangement as claimed in claim 2, wherein said mechanical switch has a movable contact arranged to move between two positions, said movable contact assuming a first position when said tape recorder is disengaged from said associated device and a second position when said tape recorder engages said associated device by being depressed by a projection provided to said associated device.

4. A circuit arrangement as claimed in claim 1, wherein said second switch comprises two mechanical switches connected in series, one of said two mechanical switches being arranged to close when a fast forward or rewind button of said tape recorder is manipulated, the other of the of said two mechanical switches being arranged to close when a playback button of said tape recorder is manipulated.

5. A circuit arrangement as claimed in claim 1, wherein said solenoid control circuit comprises a comparator responsive to the output signal from said reproduce head, and a switching transistor responsive to the output signal from said comparator.

6. A circuit arrangement as claimed in claim 1, wherein said connecting means comprises a plurality of jacks and pins arranged to be received in said jacks respectively, said jacks being provided to said cassette tape recorder, and said pins being provided to said associated device.

7. A circuit arrangement as claimed in claim 1, wherein said connecting means comprises a plurality of jacks and pins arranged to be received in said jacks respectively, said pins being provided to said cassette tape recorder, and said jacks being provided to said associated device.

8. A circuit arrangement as claimed in claim 1, wherein said second power source comprises a d.c. power source and a constant voltage circuit.

9. A circuit arrangement as claimed in claim 1, wherein said associated device comprises a radio receiver, having at least one power amplifier and a speaker.

10. A circuit arrangement as claimed in claim 1, wherein said associated device has a recess for receiving said cassette tape recorder therein.

* * * * *